United States Patent [19]

Takeda et al.

[11] Patent Number: 5,308,708
[45] Date of Patent: May 3, 1994

[54] CARTRIDGE SHUTTER AND MATERIAL FOR ITS PRODUCTION

[75] Inventors: Motohiko Takeda, Tokyo; Toshiaki Sanada, Hyogo; Shuichi Kikuchi, Miyagi, all of Japan

[73] Assignees: Kawasaki Steel Corporation; Sony Corporation, both of Japan

[21] Appl. No.: 987,138

[22] Filed: Dec. 8, 1992

[30] Foreign Application Priority Data

Dec. 9, 1991 [JP] Japan .................. 3-324570

[51] Int. Cl.⁵ .............................. G11B 23/03
[52] U.S. Cl. ............................ 428/610; 428/687; 360/133; 206/444
[58] Field of Search ............. 360/133; 369/291; 206/444; 428/600, 595, 603, 687, 610

[56] References Cited

U.S. PATENT DOCUMENTS

| | | | |
|---|---|---|---|
| 2,991,544 | 7/1961 | Gotsch et al. | 428/687 |
| 3,556,874 | 1/1971 | McClain | 428/687 |
| 3,619,881 | 11/1971 | Bills et al. | 428/687 |
| 4,775,599 | 10/1988 | Matsuoka et al. | 428/687 |
| 5,151,894 | 9/1992 | Fujita | 360/133 |
| 5,161,080 | 11/1992 | Funayama et al. | 360/133 |

FOREIGN PATENT DOCUMENTS

1286190 11/1989 Japan .
2137176 5/1990 Japan .
1045641 10/1966 United Kingdom ............ 428/687

*Primary Examiner*—John Zimmerman
*Attorney, Agent, or Firm*—Austin R. Miller

[57] ABSTRACT

A shutter for a cartridge for containing a recording medium that has excellent scratch resistance and dust-proofness. The shutter is composed of a nonmagnetic corrosion resistant steel sheet containing at least about 10% by weight of Cr, and includes a front surface having a hardness (Hv) of not less than about 250 but not more than 400 and a roughness expressed as an average surface roughness (Ra) of not less than about 0.3 μm but not more than 1.0 μm, and a reverse surface having a roughness (Ra) adjusted to about 0.1 to 0.25 μm if the reverse surface is finished as a dull surface, and adjusted to about 0.15 to 0.50 μm if the reverse surface is finished by a grinding roll. The steel sheet has first and second surfaces which are to respectively constitute the outer and inner surfaces of the shutter, and which have surface roughness values corresponding to the above surface roughness values of the front and reverse surfaces of the steel sheet. In addition, the steel sheet has a hardness (Hv) of about 220 to 350 in the central portion of the thickness dimension thereof, and a hardness (Hv) of not less than about 250 but not more than 400 in the surface layer portion on the outer surface of the shutter.

5 Claims, 5 Drawing Sheets

CARTRIDGE SHUTTER AND MATERIAL FOR ITS PRODUCTION

BACKGROUND OF THE INVENTION

1. Field of the Invention

The present invention relates to a shutter for a cartridge for a magnetic or optical recording medium, such as a micro-floppy disk, and further relates to a stainless steel sheet for the production of such a shutter.

2. Description of Related Art

A cartridge such as a cassette for a floppy disk generally comprises a plastic cassette for accommodating a disk and a shutter for closing and opening a slot formed in the cassette body and through which a recording and reproduction head can access. The shutter is adapted to open the slot only when the disk is in use and to close the slot when the disk is not in use, that is, when no recording or reproduction is to take place, so as to protect the disk inside the cassette.

Such a shutter is produced, in general, by stamping stainless steel into a predetermined shape, and then bending it. An alternative is to injection-mold or heat a synthetic resin or a like material to bend it into a predetermined shape.

Since a synthetic resin shutter tends to take on an electrostatic charge, there is a high risk that foreign matter, such as dust, will adhere to the magnetic recording medium, thereby causing a high risk of signal dropping, called signal dropouts. In order to prevent these risks, a synthetic resin shutter is surface coated with an antistatic agent or the like. However, since the use of a synthetic resin suffers other problems, such as insufficient heat resistance, a metal such as stainless steel has been used in many cases.

Figure 5:
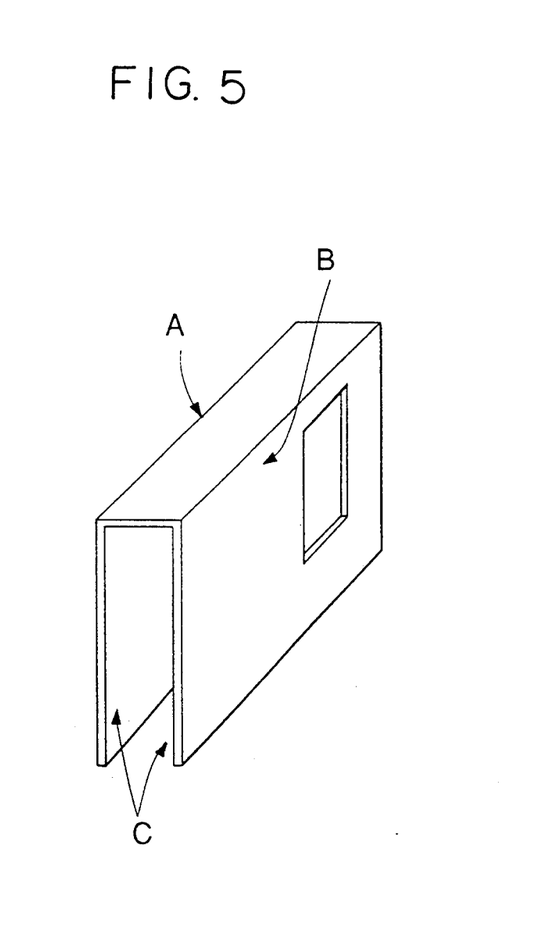
FIG. 5 is a perspective view of a shutter, showing one configuration.

A stainless steel shutter, as illustrated in FIG. 5 of the drawings, is generally composed of a steel sheet known as a hair-line finished material prepared by melting an alloy whose chemical composition is, for example, 18% by weight (percentages by weight will hereinafter be abbreviated as "%") of chromium (Cr), and 8% of nickel (Ni), the balance essentially consisting of iron (Fe), subjecting the alloy to hot rolling, cold rolling and heat treatment so as to obtain an alloy sheet of a predetermined thickness, and forming fine streaks or lines on the surface of the sheet with emery cloth or the like so that the surface will be and remain free from marks such as fingerprints, and will thus maintain good external appearance.

In the production of such a shutter, in order to prevent curling of the stainless steel sheet material when it is being rolled, the roughnesses of hair lines on the upper and lower surfaces of the steel sheet are controlled to be the same. However, the actual functions required from a shutter basically differ as between its front surface and the reverse surface.

Therefore, when a normal hair-line finished material is used for making a shutter, the production of the shutter and the shutter itself face the following problems:

(1) When the shutter is being opened or closed, the hair-line finished inner surface of the shutter abrades a portion of the plastic cartridge body. Dust generated by abrasion may adhere to the magnetic recording medium, and may cause signal dropout;

(2) If the outer surface of the shutter does not have sufficient hardness, the outer surface of the shutter tends to become scratched during the process of assembling the cartridge. Such scratches may spoil the external appearance of the cartridge, and may decrease yield;

(3) If the hardness of the shutter material is to be increased in order to prevent formation of scratches, this makes it necessary to form the shutter material by strongly bending it, but this presents the risk of cracking portions which are to become corner portions of the shutter. In addition, stamping the shutter material becomes difficult.

(4) In order for the shutter to be able to maintain its desired configuration, the shutter material must have a certain minimum of rigidity. However, since sufficient hardness is required, as described above, it is difficult to achieve the required rigidity as well; and (5) The shutter metal should be able to accept printing thereon, such as printing stating the characteristics, the functions and the trade mark of the cartridge. However, the use of a conventional hair-line finished metal makes it difficult to print characters and patterns having fine lines of a width of not more than 0.1 mm.

SUMMARY OF THE INVENTION

It is an object of the present invention is to provide a shutter which is essentially dust free during use, thereby preventing signal dropout.

Another object of the present invention is to provide a shutter which is resistant to being scratched when being handled.

Yet another object of the present invention is to provide a steel sheet suitable for producing a shutter having the above-described advantages.

The above and other objects of the present invention will be apparent from the following descriptions, which are intended to be directed to preferred embodiments of the invention but not to define or limit the scope of the invention, which is defined in the appended claims.

We have made numerous studies and have found that it is possible to create such a shutter if an outer surface of the shutter, which in practice is prone to be scratched, has a high hardness and roughness, and an inner surface portion of the shutter, which is to be disposed in contact with a plastic body of a cartridge, has lower roughness, provided other critical parameters are also present.

We have made numerous additional studies and as a result we have found that, in order to prevent cracking during the forming process, it is necessary to control the hardness of the central portion, taken along the thickness dimension of the steel sheet, within a certain range. Hence, we have created a novel shutter and a novel steel sheet in which the shutter has different hardnesses and roughnesses as between the upper and lower surfaces of the steel sheet (the outer and inner surfaces of the shutter made from the sheet), and having a lower hardness at the thicknesswise central portion of the steel sheet.

Thus, according to the present invention, a shutter is provided for a cartridge having excellent scratch resistance and dust-proofness. The shutter is composed of a nonmagnetic corrosion resisting steel sheet containing at least about 10% by weight of Cr, the shutter having a hardness (Hv) of not less than about 220 but not more than 350 in a thicknesswise central portion of the shutter and also having on its outer surface a hardness of not less than about 250 but not more than 400, the outer surface of the shutter having a roughness expressed as an average surface roughness (Ra) of not less than about 0.3 $\mu$m but not more than 1.0 $\mu$m and the inner surface of the shutter having a roughness (Ra) of about 0.1 to 0.25 μm if the inner surface is dull surface, and adjusted to about 0.15 to 0.50 μm if the inner surface of the shutter is finished by a grinding roll.

According to the present invention, a steel sheet is provided for a shutter for a cartridge having excellent scratch resistance and dust-proofness, the steel sheet being a nonmagnetic corrosion resisting steel sheet containing at least about 10% by weight of Cr, the steel sheet having in a thicknesswise central portion a hardness (Hv) of about 220 to 350 and having in the upper surface layer portion on one surface a hardness (Hv) of not less than about 250 but not more than 400 and having a roughness expressed as an average surface roughness (Ra) of not less than about 0.3 μm but not more than 1.0 μm. The other (lower) surface of the steel sheet has a roughness (Ra) about 0.1 to 0.25 μm if such lower surface is finished as a dull surface, and of about 0.15 to 0.50 μm if such lower surface (intended to become the inner surface of the shutter) is finished by a grinding roll.

In the present invention the surface layer portion of a steel sheet is understood to be that portion which lies within a depth of about 10 μm from the corresponding surface. The central portion in the thickness direction of the steel sheet usually lies at a depth of about 30 μm or greater from the surfaces of the steel sheet.

BRIEF DESCRIPTION OF DRAWING

The drawings are intended to illustrate preferred embodiments of the invention and are not intended to limit the scope of the invention which is defined in the appended claims.

DETAILED DESCRIPTION OF THE PRESENT INVENTION

According to the present invention a nonmagnetic corrosion resisting steel sheet containing at least about 10% of Cr is used as a material for making a shutter for a cartridge. Use of a ferromagnetic material hinders demagnetization of a magnetic recording medium, which is intended to be performed after completion of the cartridge. An example of such a corrosion resistant nonmagnetic material which may be advantageously used is 18-8 stainless steel.

The outer surface of the shutter should have a hardness (Vickers hardness; hereinafter abbreviated to "Hv") of not less than about 250 but not more than 400. This is for the purpose of preventing scratch formation during the assembly of the shutter member onto the cartridge body.

The maximum hardness value of the shutter on its outer surface is not limited, however since the shutter is manufactured by the method which will be described below, the hardness usually does not exceed 400. From the viewpoint of manufacture and practical use, the maximum surface roughness of the shutter will usually be not more than 1.0 μm.

The outer surface of the shutter should have a surface roughness expressed as an average surface roughness (Ra) of not less than about 0.3 μm but not more than 1.0 μm. If this surface roughness (Ra) is less than about 0.3 μm, the front surface tends to be prone to marking with fingerprints or the like. Another disadvantage is that, during the production of shutters, they tend to become scratched by contacting each other, thereby decreasing yield and productivity.

The inner surface of the shutter should have a surface roughness within a certain range in view of the risk that the inner surface may cause dust generation by abrading against the cassette body, which is usually made of a plastic material. If the inner surface of the shutter, which is usually the lower surface of the steel sheet as it is produced, is as rough as the outer surface of the shutter, projections which are in contact with the cassette body abrade a portion of the plastic cassette body, thereby generating dust. However, if the inner surface of the shutter has too little roughness the production of shutters involves the risk of scratch formation due to contact between the shutters.

If there is a great difference between the roughness of the inner surface and the roughness of the outer surface of the shutter material, or the steel sheet, it may tend to curl into a bow shape in longitudinal direction (hereinafter referred to as "L-bow"), making pressing difficult.

In view of these problems, according to the present invention, the roughness of the inner surface of the shutter is specified within the following range which does not involve the above risks: Where the surface roughness of the lower surface of the steel sheet (which is intended to become the inner surface of the shutter) is to be adjusted by using dull rolls, that surface roughness should be maintained within a surface roughness (Ra) range from about 0.1 to 0.25 μm. Where the surface roughness of the lower surface of the steel sheet is to be adjusted by using grinding rolls with their direction of surface-finishing aligned with the intended direction of opening and closing motion of the shutter, that surface roughness should be brought within a surface roughness (Ra) range from about 0.15 to 0.50 μm.

Thus, finishing the lower surface with grinding rolls makes it possible to attain a surface roughness range which includes greater roughnesses than the surface roughness range adopted in the case of dull-roll finishing. This is because, if the surface roughness resulting from such finishing has streaks running in a direction aligned with the sliding direction of the shutter, these streaks serve to facilitate the sliding of the shutter.

For the production of a shutter having the described characteristics, it is further necessary to provide further properties beyond hardness and roughness of the upper and lower surfaces.

FIG. 5 shows a typical configuration of a shutter. During the formation of the shutter material into such a configuration, the material is bent at portions corresponding to corner portions A with a very small radius of curvature. This means that these portions tend to crack.

In order to prevent such crack formation, it is important to provide a hardness (Hv) ranging from about 220 to 350 in the thicknesswise central portion of the steel sheet. If the hardness (Hv) of this portion is less than about 220 the shutter material fails to assume the rigidity required from a shutter. If the hardness (Hv) exceeds about 350 the shutter material is too hard to prevent cracking during the forming process.

In FIG. 5, the shutter has an outer surface B and inner surfaces C which have the above-described surface properties. In this description the outer surface B is said to correspond to the upper surface of the steel sheet from which it was made, and the inner surface C is said to correspond to the lower surface of the steel sheet from which it is made, but any such relationship is subject to many variations, including the reverse relationship, subject to manufacturing convenience.

According to the present invention, we have discovered the importance of a controlled gradient of hardness in the thickness dimension of a shutter material for the first time.

Turning now to the preparation of the sheet, preferable methods for preparing a metal sheet for a shutter according to the present invention will be described.

An alloy whose chemical composition has been adjusted to a predetermined composition is melted, cast, hot rolled, and thereafter repeatedly subjected to cold rolling until a predetermined thickness is achieved. In order to obtain the required hardness of a surface layer portion of a steel sheet, a gradient of hardness in its thickness direction, and roughnesses of the upper and lower surfaces which are all within the ranges of the present invention, it is important that the cold rolling step should employ suitable rolls and a suitable amount of rolling reduction.

If the cold rolling step employs common smooth rolls, it is not possible to obtain the required predetermined hardnesses of the surface layer portion and the thicknesswise central portion of the steel sheet, nor is it possible to obtain the required surface roughnesses of the upper and lower surfaces thereof, even if the rolling reduction conditions are suitably adjusted.

Therefore, according to the present invention, the cold rolling step employs paired dull rolls whose surfaces have been finished with certain roughnesses. In order to obtain the desired hardnesses of these portions and the desired roughnesses of the upper and lower surfaces of the sheet, it is necessary that a first dull roll for rolling a first surface of the steel sheet have a surface roughness of not less than about 0.4 μm (preferably, not less than about 0.4 μm but not more than about 3.0 μm), and a second dull roll for rolling the second surface have a surface roughness of about 0.13 to 0.33 μm. The second dull roll may alternatively comprise a grinding roll having a roll surface ground with a grindstone to a surface roughness of about 0.2 to 0.7 μm.

Figure 1A:
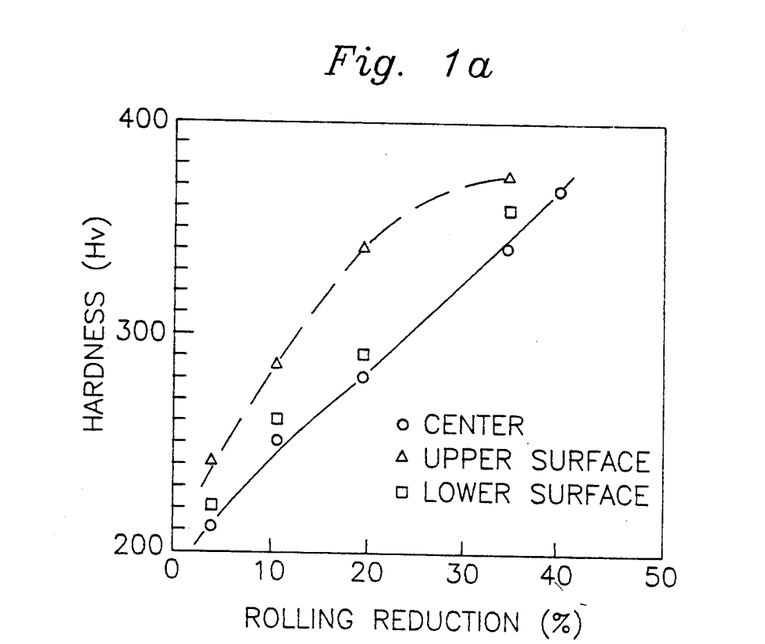
FIG. 1(a) is a graph showing the relationship between rolling reduction of cold rolling and hardnesses of the upper and lower surfaces and the thicknesswise central portion of a steel sheet.
Figure 1B:
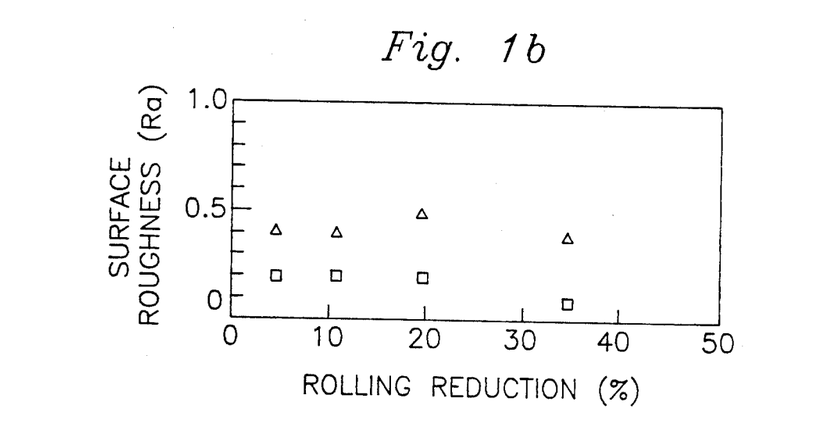
FIG. 1(b) is a graph showing the relationship between rolling reduction and roughness of the upper and lower surfaces of the steel sheet, when the cold rolling step is performed by using paired dull rolls.

FIGS. 1(a) and 1(b) show the results of examining the relationship of the rolling reduction with the hardnesses of the upper and lower surfaces and the thicknesswise central portion of a steel sheet as well as the relationship of the rolling reduction with the surface roughnesses of the upper and lower surfaces of the steel sheet, the results being obtained by performing cold rolling employing a pair of dull rolls having surface roughnesses of 0.6 μm and 0.3 μm, within the scope of this invention.

The upper surface of a steel sheet is, normally as a matter of convenience, a surface thereof which, when the steel sheet is formed into a shutter, constitutes the outer surface of the shutter, and the lower surface of the steel sheet constitutes the inner surface of the shutter.

As is clearly seen from FIG. 1(b), if the rolling reduction is less than about 5%, the hardnesses of the surface layer portion and that of the central portion are so low that the shutter will have insufficient rigidity and be vulnerable to scratching. If the rolling reduction exceeds about 40% the press forming process involves the risk of crack formation. Thus, it is not possible to obtain a shutter having all of the desired characteristics of scratch resistance, press-formability and dustproofness.

Figure 2A:
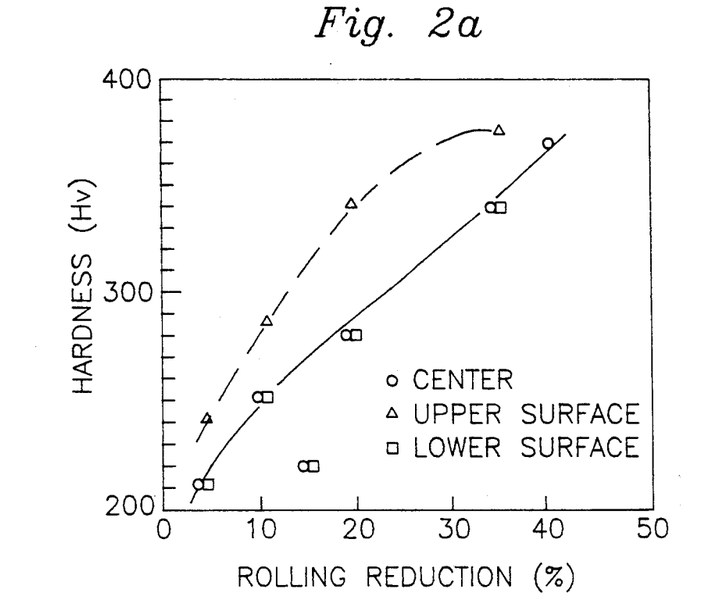
FIG. 2(a) is a graph showing the relationship between rolling reduction of cold rolling with hardness of the upper and lower surfaces and the thicknesswise central portion of a steel sheet.
Figure 2B:
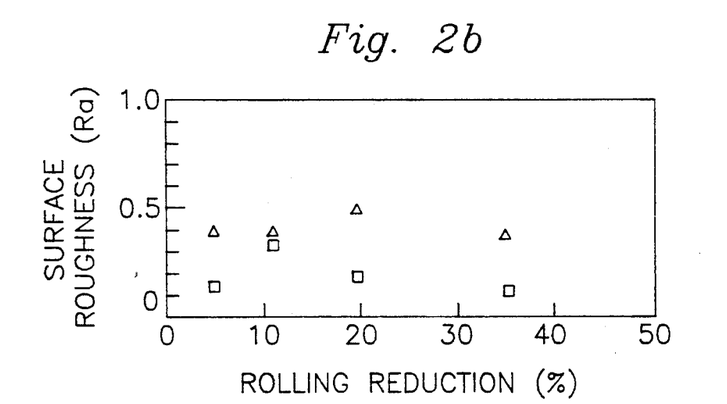
FIG. 2(b) is a graph showing the relationship between the rolling reduction and roughnesses of the upper and lower surfaces of the steel sheet, when the cold rolling step is performed by using paired rolls comprising a dull roll and a grinding roll.

FIGS. 2(a) and 2(b) show the results of the same examination as that shown in FIGS. 1(a) and 1(b) except that the examinations shown in FIGS. 2(a) and 2(b) were conducted by performing cold rolling employing a dull roll having a surface roughness of 0.6 μm and a grinding roll having a surface roughness of 0.2 to 0.4 μm, within the scope of this invention.

As is clearly seen from FIG. 2(b) if the rolling reduction is less than about 5% the hardnesses of the surface layer portion and that of the central portion are so low that the resultant shutter will have insufficient rigidity, and be vulnerable to scratching. If the rolling reduction exceeds about 40% the press forming process involves the risk of crack formation. These results are similar to those shown in FIGS. 1(a) and 1(b).

Figure 3:
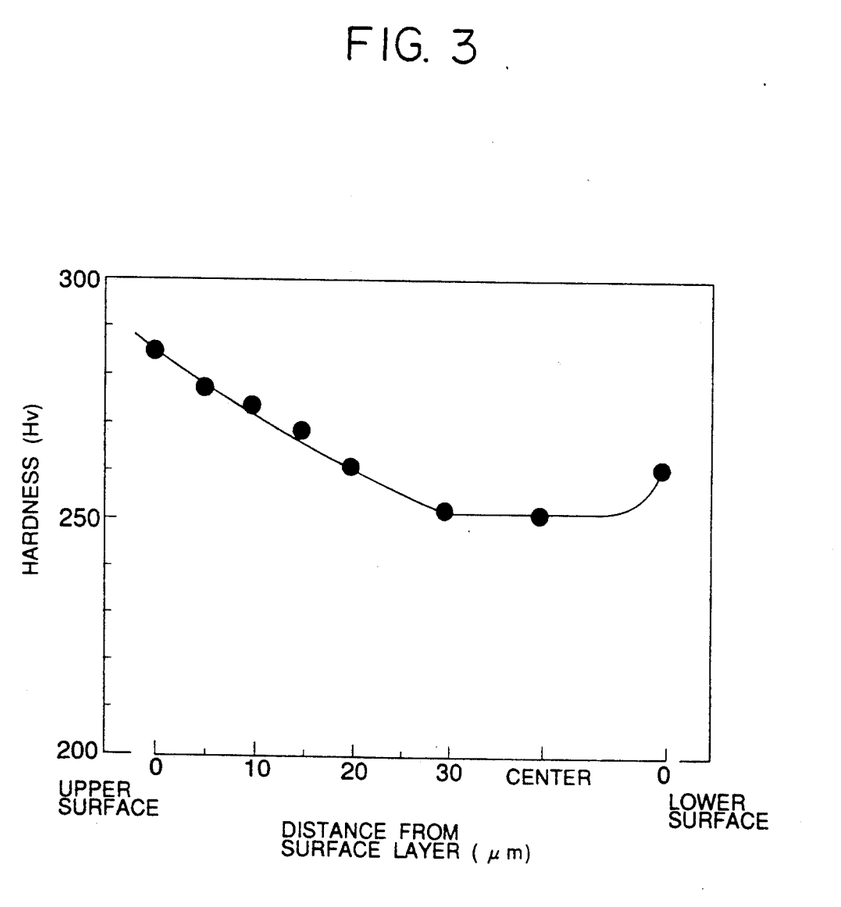
FIG. 3 is a graph showing the distribution of hardnesses in the thickness direction of a cold rolled steel sheet which has been cold rolled with paired dull rolls.

FIG. 3 shows the results of examining the distribution of hardnesses in the thickness direction of a 0.2 mm-thick cold rolled steel sheet which was obtained by cold rolling a SUS 304 austenitic stainless steel sheet with a rolling reduction of 11% by using paired dull rolls having surface roughnesses (Ra) of 0.6 μm and 0.3 μm.

As is shown in FIG. 3, a layer portion which lies within a depth of 10 μm and which must have a hardness corresponding to that required from a surface layer portion on the front surface has hardnesses (Hv) of not less than 270, thereby maintaining a level which is sufficient for preventing scratch formation on the front surface. On the other hand, a portion at a depth of 30 μm or greater (i.e., a thicknesswise central portion) which influences the formability of the steel sheet has a hardness (Hv) of approximately 250, thereby enabling common press forming to be satisfactorily performed.

The cold rolled steel sheet shown in FIG. 3 had roughness values of 0.4 μm and 0.2 μm on its first (upper) and second (lower) surfaces, respectively.

Figure 4:
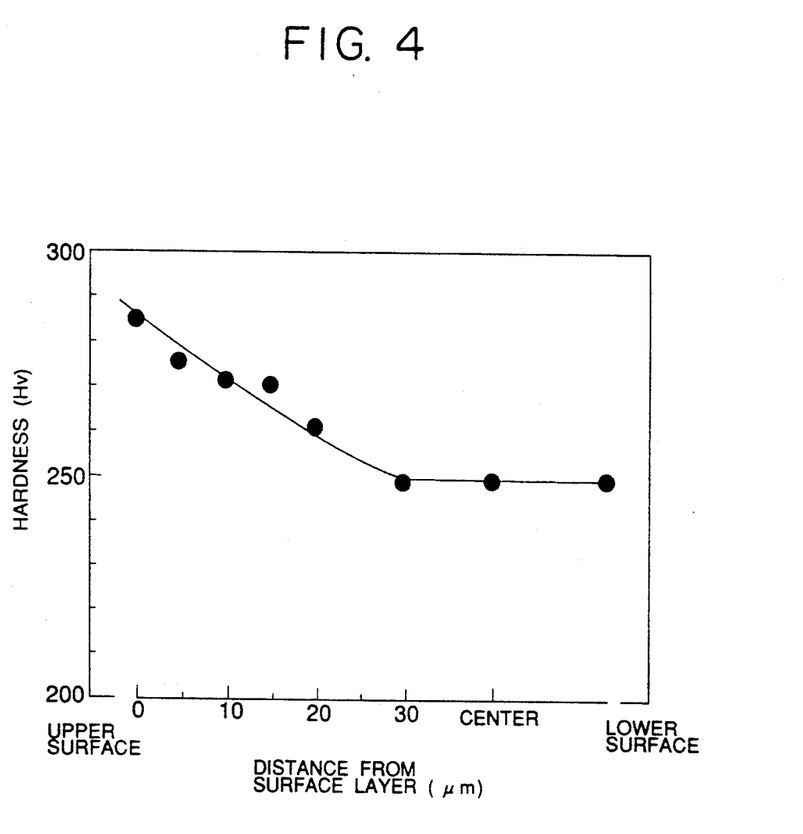
FIG. 4 is a graph showing the distribution of hardnesses in the thickness direction of a cold rolled steel sheet which has been cold rolled with paired rolls comprising a dull roll and a grinding roll.

FIG. 4 shows the results of the same examination as that shown in FIG. 3 except that the cold rolling step was performed by using a dull roll having a surface roughness (Ra) of 0.6 μm and a grinding roll having a surface roughness (Ra) of 0.45 μm, within the scope of this invention.

As is shown in FIG. 4, a layer portion which lies within a depth of 10 μm and which must have a hardness corresponding to that required from a surface layer portion on the front surface has a hardness (Hv) of not less than 270, thereby maintaining a level which is sufficient for preventing scratch formation on the front surface. On the other hand, a portion at a depth of 30 μm or greater (i.e., a thicknesswise central portion)

which influences the formability of the steel sheet has a hardness (Hv) of 250 or smaller, thereby enabling common press forming to be satisfactorily performed.

The cold rolled steel sheet shown in FIG. 4 had roughnesses of 0.4 μm and 0.35 μm on its first (upper) and second (lower) surfaces, respectively.

EXAMPLE 1

A SUS 304 austenitic stainless steel having a composition including C: 0.05%; Ni: 9%; and Cr: 18% was melted and cast, then, hot rolled, and thereafter, repeatedly subjected to cold rolling and annealing. Finally, the resulting steel sheet was used to perform cold rolling to a thickness of 0.20 mm by adopting various rolling reductions and employing paired dull rolls having surface roughnesses (Ra) of 0.6 μm and 0.3 μm (runs A 1 and A 2 of Table 1).

The thus obtained steel sheet samples had an upper-surface roughness of 0.4 μm and 0.5 μm and a lower-surface roughness of 0.20 μm and 0.20 μm (runs A 1 and A 2 of Table 1).

Each of the steel sheet samples was examined with respect to the hardness of the upper and lower surfaces, the hardness of the thicknesswise central portion, and was further examines for L-bow, scratch resistance, pressformability, dust-proofness and rigidity. The other runs B1–B7 were inadequate in regard to at least one of these important characteristics. The results of the examinations are shown in Table 1.

L-bow was evaluated by cutting off a 1 meter piece from each steel sheet sample, suspending each piece at one end, and measuring the amount by which the lower end curled. In Table 1, the evaluation results are indicated by the following symbols:

°: curling not more than 300 mm;
x: curling exceeding 300 mm

Scratch resistance was evaluated by rubbing together a plurality of pieces. In Table 1, the evaluation results are indicated by the following symbols:

°: no scratch formation;
Δ: slight scratch formation;
x: scratch formation occurred Press-formability was evaluated on the basis of whether any cracks were formed when the pieces were actually subjected to press forming. In Table 1, the evaluation results are indicated by the following symbols:

°: no crack formation;
x: crack formation occurred

Dust-proofness was evaluated by abrading each piece against a plastic material for forming a cassette body. In Table 1, the evaluation results are indicated by the following symbols:

°: no abrading of plastic;
x: generation of plastic particles

Rigidity was evaluated by actually forming each piece into a shutter and forcing the distal ends of the shutter away from each other. In Table 1, the evaluation results are indicated by the following symbols:

°: no deformation;
x: deformation occurred.

TABLE 1

| No. | Roll Surface Roughness (μm) Upper | Roll Surface Roughness (μm) Lower | Rolling Reduction (%) | Hardness (Hv) Upper | Hardness (Hv) Center | Hardness (Hv) Lower | Roughness (Ra) Upper | Roughness (Ra) Lower | L-Bow | Scratch Resistance | Press-Formability | Dust-Proofness | Rigidity | Reference |
|-----|---|---|---|---|---|---|---|---|---|---|---|---|---|---|
| A1 | 0.6 | 0.3 | 11 | 285 | 250 | 260 | 0.40 | 0.20 | ° | ° | ° | ° | ° | Present Invention |
| A2 | 0.6 | 0.3 | 20 | 340 | 280 | 290 | 0.50 | 0.20 | ° | ° | ° | ° | ° | Present Invention |
| A3 | 0.6 | 0.3 | 35 | 375 | 340 | 360 | 0.40 | 0.10 | ° | ° | ° | ° | ° | Present Invention |
| B1 | 0.1 | 0.1 | 5 | 210 | 210 | 210 | 0.07 | 0.07 | ° | x | ° | ° | x | Comparison Example 1 |
| B2 | 0.6 | 0.3 | 5 | 240 | 210 | 220 | 0.40 | 0.20 | ° | Δ | ° | ° | x | Comparison Example 2 |
| B3 | 0.1 | 0.1 | 11 | 250 | 250 | 250 | 0.07 | 0.07 | ° | x | ° | ° | ° | Comparison Example 3 |
| B4 | 0.3 | 0.1 | 11 | 280 | 250 | 250 | 0.20 | 0.07 | ° | Δ | ° | ° | ° | Comparison Example 4 |
| B5 | 0.6 | 0.4 | 11 | 285 | 250 | 285 | 0.40 | 0.30 | ° | ° | ° | x | ° | Comparison Example 5 |
| B6 | 0.6 | 0.1 | 11 | 285 | 250 | 255 | 0.40 | 0.07 | x | ° | ° | ° | ° | Comparison Example 6 |
| B7 | 0.1 | 0.1 | 40 | 370 | 370 | 370 | 0.07 | 0.07 | ° | Δ | x | ° | ° | Comparison Example 7 |

As is apparent from Table 1, good results were obtained with respect to all of the examined characteristics only when the steel sheet had hardnesses of the surface portion and the thicknesswise central portion as well as roughnesses of the upper and lower surfaces which fall within the ranges of the present invention.

EXAMPLE 2

A SUS 304 austenitic stainless steel having a composition including C: 0.05%; Ni: 9%; and Cr: 18% was melted and cast, then, hot rolled, and thereafter, repeatedly subjected to cold rolling and annealing. Finally, the resultant steel sheet was subjected to cold rolling to a thickness of 0.20 mm by rolling reductions employing a combination of a dull roll having a surface roughness of 0.6 μm (run A 1 of Table 2) and a dull roll ground with a #46 grindstone and having surface roughness (Ra) of 0.45 μm (runs A 1 of Table 2).

The thus obtained steel sheet samples had upper-surface roughness and lower-surface roughness values as set forth in Table 2.

Each of the steel sheet samples was examined with respect to the same properties and characteristics as those examined in Example 1. The results of the examination are shown in Table 2. Sheets produced according to runs Nos. B1–B8 of Table 2 were inadequate with respect to at least one of the important characteristics of this invention.

TABLE 2

| No. | Roll Surface Roughness (μm) | | Rolling Reduction (%) | Hardness (Hv) | | | Roughness (Ra) | | L-Bow | Scratch Resistance | Press-Formability | Dust-Proofness | Rigidity | Reference |
|---|---|---|---|---|---|---|---|---|---|---|---|---|---|---|
| | Upper | Lower | | Upper | Center | Lower | Upper | Lower | | | | | | |
| A1 | 0.6 | 0.45 | 11 | 285 | 250 | 250 | 0.40 | 0.35 | ○ | ○ | ○ | ○ | ○ | Present Invention |
| A2 | 0.7 | 0.3 | 20 | 340 | 280 | 280 | 0.50 | 0.20 | ○ | ○ | ○ | ○ | ○ | Present Invention |
| A3 | 0.6 | 0.2 | 35 | 375 | 340 | 340 | 0.40 | 0.15 | ○ | ○ | ○ | ○ | ○ | Present Invention |
| B1 | 0.1 | 0.1 | 5 | 210 | 210 | 210 | 0.07 | 0.07 | ○ | x | ○ | ○ | x | Comparison Example 1 |
| B2 | 0.6 | 0.2 | 5 | 240 | 210 | 210 | 0.40 | 0.15 | ○ | Δ | ○ | ○ | x | Comparison Example 2 |
| B3 | 0.3 | 0.3 | 11 | 250 | 250 | 250 | 0.20 | 0.20 | ○ | Δ | ○ | ○ | ○ | Comparison Example 3 |
| B4 | 0.3 | 0.2 | 11 | 280 | 250 | 250 | 0.20 | 0.15 | ○ | Δ | ○ | ○ | ○ | Comparison Example 4 |
| B5 | 0.6 | 0.6 | 11 | 285 | 250 | 285 | 0.40 | 0.40 | ○ | ○ | ○ | x | ○ | Comparison Example 5 |
| B6 | 0.6 | 0.15 | 11 | 285 | 250 | 250 | 0.40 | 0.12 | x | ○ | ○ | ○ | ○ | Comparison Example 6 |
| B7 | 0.6 | 0.8 | 11 | 285 | 250 | 250 | 0.40 | 0.60 | ○ | ○ | ○ | x | ○ | Comparison Example 7 |
| B8 | 0.1 | 0.1 | 40 | 370 | 370 | 370 | 0.07 | 0.07 | ○ | Δ | x | ○ | ○ | Comparison Example 8 |

As is apparent from Table 2, also in a case where a combination of a dull roll and a grinding roll was used, good results were obtained with respect to all of the examined characteristics only when a steel sheet sample had hardnesses of the surface portion and the thicknesswise central portion as well as roughnesses of the upper and lower surfaces which fall within the ranges of the present invention.

Although descriptions have been provided mainly concerning an example of a cassette for a floppy disk, the present invention is not intended to be so limited, since the invention is widely applicable to any cartridges having shutters, such as digital compact cassettes, for example.

Thus, according to the present invention, it is possible to create a shutter for a cartridge which is free from scratch formation due to contact between steel sheets, which is capable of maintaining an excellent external appearance, which can be satisfactorily press-formed, and which is not subject to dust generation during use.

Although this invention has been described with reference to specific embodiments, it will be appreciated that it may be practiced in a wide variety of forms, including the use of various steels, substitution of equivalent elements for those specifically described, interchangeability of "upper" and "lower" surfaces of the steel sheet and the use of certain features independently of other features, all without departing from the spirit and scope of the invention as defined in the appended claims.

What is claimed is:

1. A shutter for a cartridge having excellent scratch resistance and dust-proofness, said shutter being composed of a nonmagnetic corrosion resistant steel sheet containing at least about 10% by weight of Cr, said shutter having a hardness (Hv) of not less than about 220 but not more than 350 in a thicknesswise central portion of the shutter and also having on the outer surface thereof a hardness (Hv) of not less than about 250 but not more than 400, the outer surface of said shutter having a roughness expressed as an average surface roughness (Ra) of not less than about 0.3 μm but not more than 1.0 μm, and the inner surface of said shutter having a roughness (Ra) of about 0.1 to 0.25 μm when said inner surface is finished as a dull surface, and wherein said inner surface has a roughness (Ra) of about 0.15 to 0.50 μm when said inner surface is finished by a grinding roll.

2. A steel sheet for a shutter for a cartridge having excellent scratch resistance and dust-proofness, said steel sheet being a nonmagnetic corrosion resistant steel sheet containing at least about 10% by weight of Cr, said steel sheet having a thicknesswise central portion of said sheet having a hardness (Hv) of about 220 to 350 and having in the surface layer portion on a first surface thereof a hardness (Hv) of not less than about 250 but not more than 400, the first surface of said steel sheet having a roughness expressed as an average surface roughness (Ra) of not less than about 0.3 μm but not more than 1.0 μm, and the other surface of said steel sheet having a roughness (Ra) of about 0.1 to 0.25 μm when said other surface is finished as a dull surface, and said other surface having a roughness (Ra) of about 0.15 to 0.50 μm when said other surface is finished by a grinding roll.

3. A steel sheet according to claim 2, wherein said steel sheet comprises 18-8 stainless steel sheet.

4. A steel sheet according to claim 2, produced by the step of subjecting a nonmagnetic corrosion resistant sheet steel containing at least about 10% by weight of Cr to final cold rolling with a rolling reduction of not less than about 5% and not more than about 40%, said final cold rolling of said sheet steel being conducted with paired rolls, said rolls comprising a dull roll having a roughness expressed as a surface roughness (Ra) of not less than about 0.4 μm and not more than about 3.0 μm, and either (A) a dull roll having a surface roughness (Ra) of about 0.13 to 0.33 μm or (B) a grinding roll having a surface roughness of about 0.2 to 0.7 μm.

5. The sheet defined in claim 2 wherein the first surface of said sheet has a hardness that is greater than the hardness of said central portion of said sheet.

* * * * *